A. J. ROBINSON.
STARTING CRANK SUPPORT.
APPLICATION FILED AUG. 6, 1914.
1,161,248.
Patented Nov. 23, 1915.
2 SHEETS—SHEET 1.
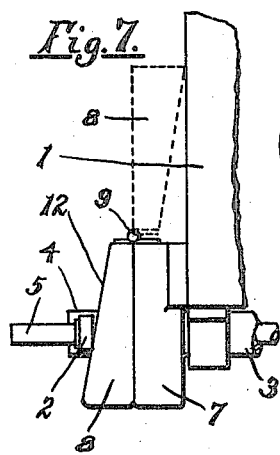
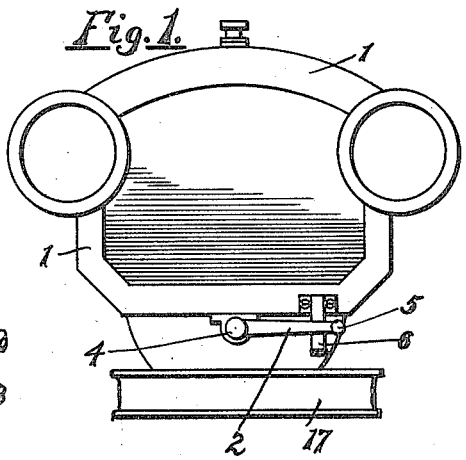
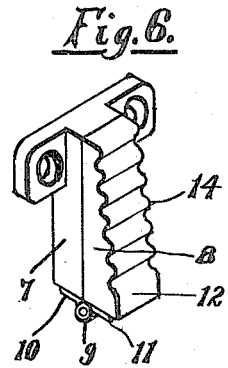
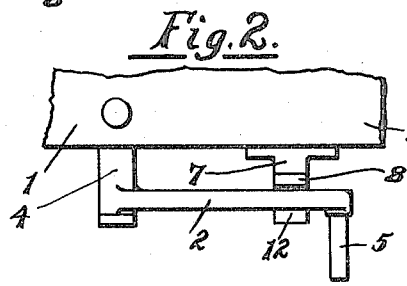
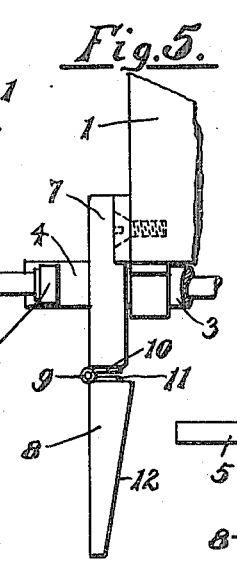
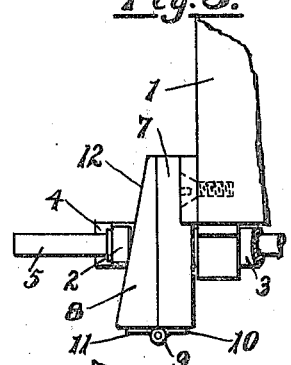
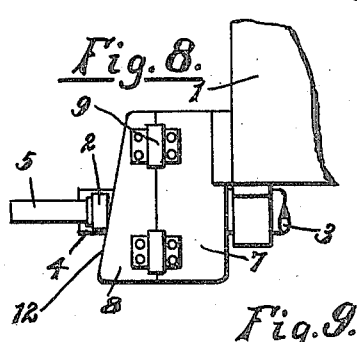
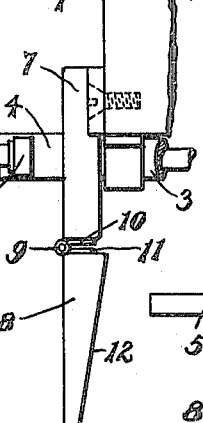
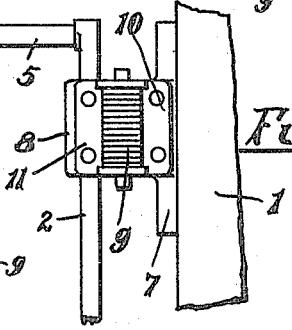
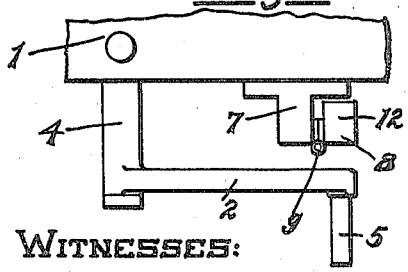
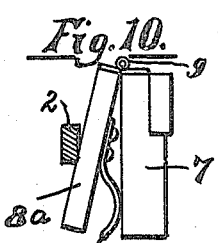
WITNESSES:
R. Lichtenstein
Benjamin H. Chertok
INVENTOR,
Aaron J. Robinson
BY David Lichtenstein
ATT'Y.

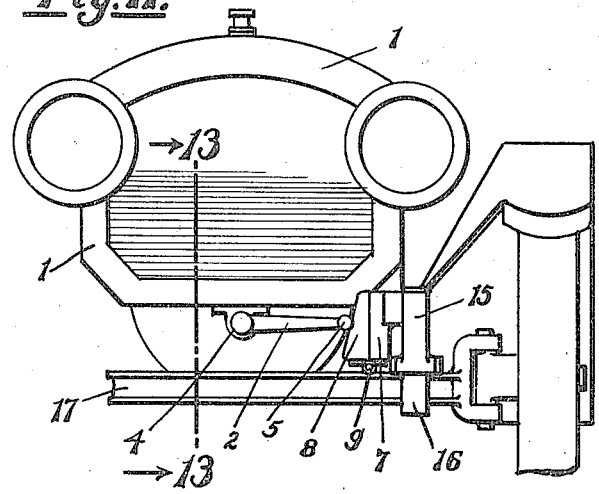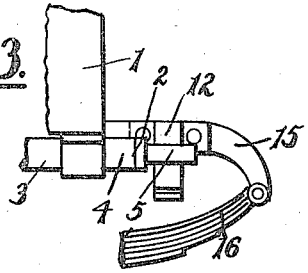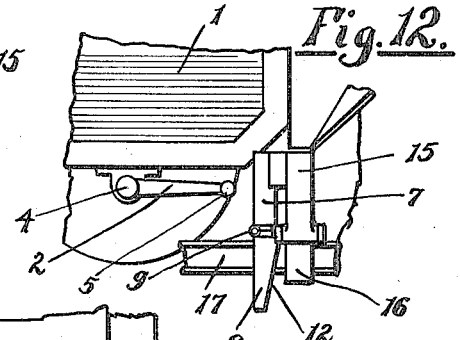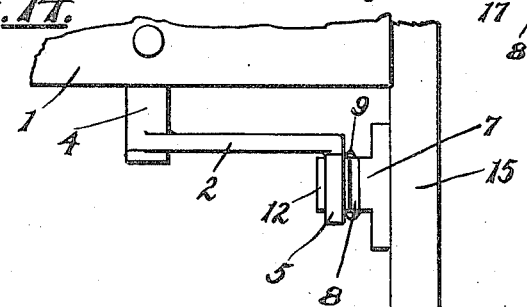

UNITED STATES PATENT OFFICE.

AARON J. ROBINSON, OF FREMONT, NEW HAMPSHIRE.

STARTING-CRANK SUPPORT.

1,161,248.  Specification of Letters Patent.  Patented Nov. 23, 1915.

Application filed August 6, 1914. Serial No. 855,454.

*To all whom it may concern:*

Be it known that I, AARON J. ROBINSON, a citizen of the United States, residing at Fremont, in the county of Rockingham and State of New Hampshire, have invented a new and useful Improvement in Starting-Crank Supports, of which the following is a specification.

My invention relates to improvements in starting-crank supports, which are simple in construction and used to support the common type of starting-crank, when the same is not being employed in cranking, in a manner that positively eliminates rattling and vibrating of the same when the car is in motion.

Another object is to provide a wedge-shaped starting-crank support, which is specially designed to clear the starting-crank when the same is employed in cranking, and to hold it rigid and secured against rattling and vibrating when engaged with the starting-crank.

Still another object is to provide a starting-crank supporting device which automatically clears the starting-crank when the same is swung from the supporting position on the support for cranking purposes,—the supporting surface of the device being inclined for the purpose of increasing the wedging effect on the starting-crank against its own tendency (due to gravity) to drop into a vertical position.

To these, as well as to other ends, my invention consists in the novel features of construction, combination and arrangement of parts set forth in the following specification, and particularly pointed out in the subjoined claims.

Referring to the accompanying drawings—Figure 1, is a part front view of a car provided with a starting-crank, showing my device fixed to the front of the radiator of the car and supporting the starting-crank. Fig. 2, is a plan of the starting-crank and supporting means as shown in Fig. 1. Fig. 3, is a right-end view of the supporting means, and starting-crank, as shown in Fig. 1. Fig. 4, is a bottom view of Fig. 3, showing the swinging hinge for automatically opening the support to clear the starting-crank when the same is being used for cranking purposes. Fig. 5, is the same view as Fig. 3, but shows the support open for clearing the starting-crank when the same is being used for starting purposes. Fig. 6, is a modified type of support, showing the supporting surface corrugated. Fig. 7, is a modified type of support, showing the swinging hinge positioned at the top of the same, the dotted lines indicating the position of the supporting member when open for clearing the crank, when the same is being used for starting purposes. Fig. 8, is a modified type of supporting device,—the same being designed with a folding member adapted to swing sidewise. Fig. 9, is a plan view of Fig. 8, showing the folding member in the clearing position. Fig. 10, is a modified type of supporting member, showing the supporting member held in the inclined position by means of a spring. Fig. 11, is a part front view of a car provided with a starting-crank, showing my device fixed to the side of the extended chassis of the car and supporting the starting-crank by engaging with the handle of the crank. Fig. 12, is the same view as Fig. 11, but shows the supporting member open to allow the starting-crank to clear the same while being employed in cranking. Fig. 13, is a view taken on line 13—13 in Fig. 11 looking in the direction of the arrows, showing the handle of the starting-crank engaging with the starting-crank support. Fig. 14, is a part plan view of Fig. 11, showing the starting-crank support fixed to the extended chassis of the car and engaging with the handle.

Like numerals refer to like parts throughout the several views of the drawings.

The numeral 1 is a radiator commonly used on automobiles propelled by internal combustion engines, which require cranking to enable the same to start operating on its working medium.

2 is the common type of starting-crank usually found to be permanently supported and carried on an extension member 3, which connects with the crank-shaft of the engine for cranking purposes.

4 is the hub of the starting-crank connected with the extension member 3, and 5 is the crank handle.

6 is the supporting member, consisting of the stationary member 7 which is preferably fixed, in any suitable manner, to the radiator 1, or to any other part of the vehicle for supporting the starting-crank.

8 is the folding member secured to the stationary member 7 by means of the spring actuated hinge 9, the normal position of said hinge being shown by Fig. 5, with the hingeplates 10 and 11 closed together by virtue of the action of the coiled spring thereon,—thus causing the support 6 to be normally held open. The folding member 8 of the supporting member 6 is provided with the inclined surface 12, which is made at an angle to form a wedge.

In Fig. 10, the numeral 13 is a spring carried by the folding member 8ª and used to support the folding member in the inclined position, as shown,—the spring 13 being strong enough to hold said folding member 8ª in the inclined position against the weight of the starting-crank for producing the same effect provided by the type of crank-support shown in Fig. 3.

14 are corrugations provided on the inclined surface 12 of the support 6.

15 is the extended chassis, which is commonly found on many types of automobiles, for engaging with the spring 16 which is mounted by the front axle 17.

Having thus described the parts of my invention in detail, the manner in which the same is used is a follows:—The support is bolted or rigidly secured to the car in any suitable manner, preferably on the front of the radiator of the same, or on the extended chasses. The normal tendency of the folding member 8 of the support 6 is to be open (as shown in Figs. 5, 7, 9 and 12) being due to the action of the spring actuated hinge 9 upon it,—such open position of the folding member permitting the starting-crank to clear the supporting means when the crank is being employed in cranking. After cranking the engine, by means of the starting crank 2, and starting it operating on its own working medium, the folding member is closed against the stationary member 7 (as shown in Figs. 3, 6, 7 and 11) and the starting-crank 2 is brought into contact with the inclined surface 12, thereby wedging the starting-crank into a rigid position, and remaining rigidly fixed with the supporting member until removed therefrom. It may be observed at this point, that with the car in motion and the tendency of the crank-handle 5 of the starting-crank 2 to drop to a vertical position, as has already been suggested, the wedging effect of the support keeps increasing on the starting-crank and positively insures against rattling and vibrating of the same. It may also be observed that as soon as the starting-crank is lifted upward and away from the supporting position on the support, that the folding member 8 immediately opens up automatically and permits the starting-crank to pass the supporting means without interference, while the same is being employed in cranking,—the folding member remaining in the open position until the same is reset and the starting-crank is engaged with the inclined surface of the same as heretofore explained.

While I have shown the supporting means fixed to the right hand side of the radiator 1 and the extended chassis 15, the same may be positioned to equal advantage on the opposite side of the radiator or opposite chassis. Also, while I have shown the supporting member secured to the front of the radiator and chassis, I do not wish to be limited against securing the same to any other part of the radiator or car, where the device may be used to the advantages herein set forth.

It may be observed that the modifications exploited in Figs. 7, 8 and 10, respectively, are in every way as advantageous as the type shown in Fig. 3.

It may be observed that my invention is a simple, inexpensive and practical device, which may be applied to any type of car carrying a starting-crank, and will insure positively against the rattling and vibrating of the starting-crank, which often causes it to work loose from its position,—thereby resulting in unnecessary trouble as well as annoyance to the passengers in the car, through the noise produced by the rattling of the starting-crank.

It may also be observed that my support cannot lose its holding power by wear, et cetera, as is common with other types of supports used for the same purpose,—my support being specially designed to overcome that feature by the use of the wedge, which is at all times in order for taking up any slack, between the starting-crank and the parts supporting the same, thereby at all times holding the same secured against rattling and vibrating.

While the preferred embodiments of my invention have been described in detail, it will be understood that I do not wish to be limited to the particular construction set forth, since various changes in the form, material, proportion and arrangement of parts and in the details of construction may be resorted to without departing from the spirit and scope of the invention or destroying any of the advantages contained in the same, heretofore described and defined in the subjoined claims.

I claim:—

1. A starting-crank support of the character described, consisting of a wedge-shaped member having the working surface cut to form an angle with a plane at right angles with the plane of the crank-shaft of the engine to which the starting-crank is connected, for engaging with the starting-crank when the same is not in operation; and means for automatically swinging said wedge-shaped member into the inoperative position when the starting-crank is disengaged therefrom and put into operation.

2. A starting-crank support of the character described, consisting of a wedge-shaped member having the inclined working surface cut in a plane forming an angle with the vertical plane passing through the center lines of the engine cylinders for engaging with the starting-crank when the same is not in operation; and means for automatically swinging said wedge-shaped member into the inoperative position when the starting-crank is disengaged therefrom and put into operation.

3. A starting-crank support of the character described, consisting of a swinging member having an inclined working surface adapted to engage with the starting-crank when the same is not in operation; a stationary member; means for holding the said stationary member rigidly fixed to the car, and means for automatically swinging said swinging member into the inoperative position when the starting-crank is disengaged therefrom and put into operation, substantially as shown.

4. A starting-crank support of the character described, comprising a folding member provided with a wedge and adapted to engage with and hold the crank against vibrating and rattling, and means for automatically swinging said folding member into the inoperative position when the starting-crank is disengaged therefrom and put into operation, substantially as shown.

5. A starting-crank support of the character described, comprising a folding member having a stationary element adapted to be fixed to the front of a car; a swinging element provided with a wedge for supporting the crank and holding the same against vibrating and rattling, and means for automatically swinging said swinging element into the inoperative position when the starting-crank is disengaged therefrom and put into operation, substantially as shown.

6. A starting-crank support of the character described, consisting of a jointed member having one stationary and one movable element swingingly united, the latter being provided with a wedge-shaped outer surface for engaging with the starting-crank, and adapted to hold the same secured against vibrating and rattling, and means for automatically swinging said movable element into the inoperative position when the starting-crank is disengaged therefrom and put into operation, substantially as shown.

7. A starting-crank support of the character described, consisting of a stationary member adapted to be secured to the front of the radiator of a car; a folding member provided with an inclined working plane and adapted to be swung from the working position; and means for swingingly engaging said folding member with said stationary member, substantially as shown.

8. A starting-crank support of the character described, consisting of a stationary member adapted to be fixed to the front of a car; a folding member swingingly connected with said stationary member and provided with an inclined working surface, said member being adapted normally to support the starting-crank on said inclined working surface and to clear said crank when removed therefrom; and means for holding said folding member in swinging engagement with said stationary member, substantially as shown.

9. A starting-crank support of the character described, consisting of a stationary member adapted to be secured to the front of a radiator; a tapered swinging member, swingingly engaged with said stationary member and adapted to normally clear the starting-crank and otherwise to support the same, substantially as shown.

AARON J. ROBINSON.

Witnesses:
 GEORGE N. JOHNSON,
 CHARLES W. SANBORN.

Copies of this patent may be obtained for five cents each, by addressing the "Commissioner of Patents, Washington, D. C."